*Amos Bachelder's Impt. in Flat Irons.*
No. 117592 — Fig. 1 — PATENTED AUG. 1 1871
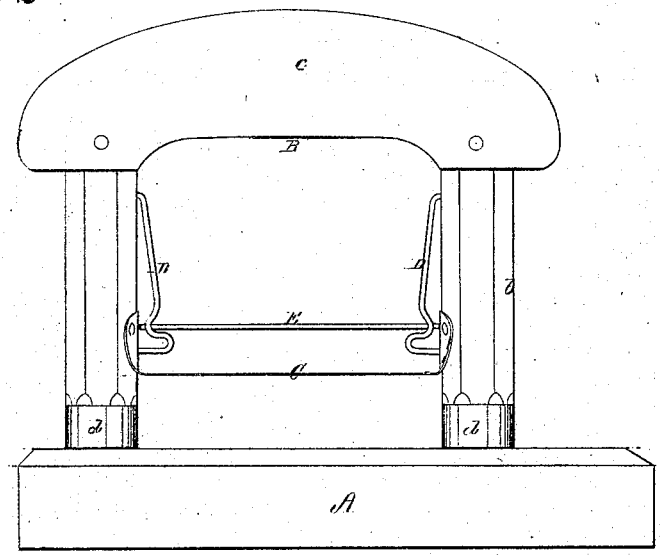
Fig. 2.
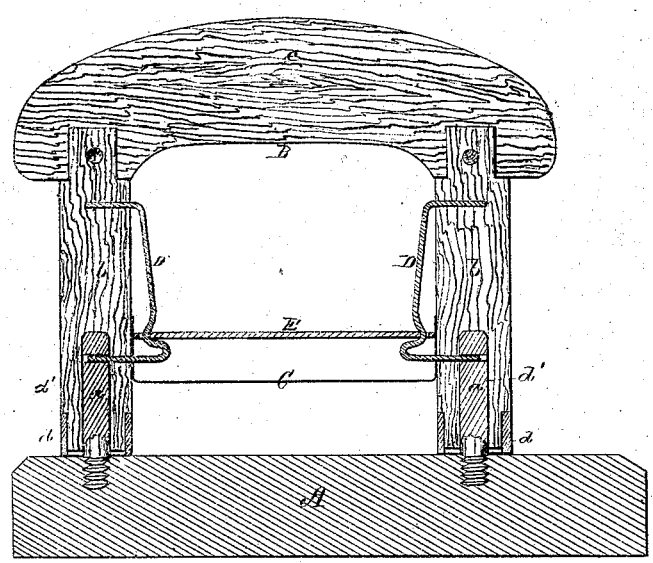
Witnesses.
S. N. Piper
L. N. Möller
A. Bachelder
by his attorney
R. H. Eddy

UNITED STATES PATENT OFFICE.

AMOS BACHELDER, OF PELHAM, NEW HAMPSHIRE.

IMPROVEMENT IN FLAT-IRONS.

Specification forming part of Letters Patent No. 117,592, dated August 1, 1871.

*To all whom it may concern:*

Be it known that I, AMOS BACHELDER, of Pelham, of the county of Hillsborough, of the State of New Hampshire, have invented a new and useful Improvement in Flat-Irons; and I do hereby declare the same to be fully described in the following specification and represented in the accompanying drawing, of which—

Figure 1 denotes a side elevation, and Fig. 2 a longitudinal and vertical section of a flat-iron containing my invention.

In this flat-iron the handle is to be made of wood or some other proper and good heat non-conducting material, the body of the implement being of cast-iron and formed with tenons projecting up from it to enter corresponding mortises on the legs of the handle. The object of making the handle and applying it to the body in manner as herein described is to save the necessity of using a cloth or holder while grasping the handle and ironing with the flat-iron. The wooden handle will answer for one or more of the metallic bodies, one or more of which may be in the process of being heated while one may be connected to and in use with the handle, the connection or disengagement of the handle and a body being readily performed by the operation through the means of the bar connecting the two spring-bolts. The handle, being mainly composed of wood or other suitable non-conductor of heat, may be taken hold of at any time without there being any necessity of using a cloth holder wrapped around such handle.

In the drawing, A denotes the said body, and *a a* the tenon thereof, which may be cylindrical. The handle is shown at B as formed of two wooden vertical legs, *b b*, connected by an arched cross-bar, *c*, of wood. Metallic ferrules *d d* are fixed in the legs at their lower ends to prevent them from being split; and, furthermore, these legs are connected by a metallic disk or plate, *c*, which serves not only to strengthen the handle, but as a guard to protect the hand of a person, while holding the handle, from the heat that may be radiated from the body of the flat-iron when heated. Two spring-bolts, D D, formed as represented, are fastened at their upper ends to the two legs of the handle and arranged therewith, as shown. These bolts work into the legs, and when closed or forced into them they, the said bolts, pass through the mortises *d' d'* for reception of the tenons. They also go through the tenons when they are in the mortises, and thereby serve to hold the body in connection with the handle. A bar, E, arranged, as shown, to slide on the two springs of the bolts, serves, when pressed downward, to move the springs in opposite directions, so as to shoot the bolts into the legs. While being raised upward at one end, the bar allows the springs to so act as to withdraw the bolts from the tenons.

I claim—

1. The two spring-bolts, D D, and their operative bar E, arranged together and with the handle and its mortises, as set forth.

2. The movable body A and its tenons *a a*, in combination with the mortised handle B, as described, and the spring-bolts D D and their operative bar E, arranged with the handle A, as shown.

3. The mortised wooden handle B, the spring-bolts D D, the operative bar E, the guard C, and the tenoned body A, all constructed and arranged substantially in manner and to operate as explained.

AMOS BACHELDER.

Witnesses:
R. H. EDDY,
J. R. SNOW.